:::

(12) United States Patent
Bouzegi et al.

(10) Patent No.: US 9,166,851 B2
(45) Date of Patent: Oct. 20, 2015

(54) IDENTIFICATION METHOD OF AN OFDM SIGNAL

(75) Inventors: Abdelaziz Bouzegi, Grenoble (FR); Philippe Ciblat, Paris (FR); Pierre Jallon, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 778 days.

(21) Appl. No.: 13/266,501

(22) PCT Filed: Apr. 22, 2010

(86) PCT No.: PCT/EP2010/055351
§ 371 (c)(1),
(2), (4) Date: Feb. 7, 2012

(87) PCT Pub. No.: WO2010/124986
PCT Pub. Date: Nov. 4, 2010

(65) Prior Publication Data
US 2012/0128086 A1    May 24, 2012

(30) Foreign Application Priority Data
Apr. 29, 2009    (FR) .................................... 09 52818

(51) Int. Cl.
*H04B 7/02*    (2006.01)
*H04L 27/06*    (2006.01)
*H04L 27/26*    (2006.01)

(52) U.S. Cl.
CPC ................................ *H04L 27/2647* (2013.01)

(58) Field of Classification Search
CPC ...... H04W 72/04; H04W 12/06; H04W 40/02; H04W 4/26; H04W 68/02; H04W 76/02; H04W 76/021; H04W 76/023; H04W 24/00; H04W 24/02; H04W 24/08; H04W 36/24; H04W 40/04; H04W 48/16; H04W 52/0206; H04W 52/0209; H04W 72/0413; H04W 72/042; H04W 72/1231
USPC ............ 375/240.26, 240.27, 6–348; 455/450, 455/423, 405; 370/210, 338, 351; 714/736, 714/752, 794–795
See application file for complete search history.

(56) References Cited

U.S. PATENT DOCUMENTS 5,515,300 A    5/1996  Pierce
8,009,724 B2 *    8/2011  Razzell et al. ................ 375/150

(Continued)

OTHER PUBLICATIONS

International Search Report issued May 20, 2010 in PCT/EP2010/055351 with English Translation of Category of Cited Documents.

(Continued)

*Primary Examiner* — Linda Wong
(74) *Attorney, Agent, or Firm* — Oblon, McClelland, Maier & Neustadt, L.L.P.

(57) ABSTRACT

An OFDM signal identification method in a received signal, wherein the received signal is sampled and cut off into blocks of P samples, each block being subjected to an inverse Fourier transform to obtain a plurality of symbols at a plurality of frequencies. For each frequency of the plurality, the kurtosis of the set of symbols thus obtained at this frequency is calculated, and then it is determined whether the kurtosis has a periodicity in frequency domain from kurtosis values calculated for the frequencies of the plurality, and the presence of an OFDM signal in the received signal is identified if the kurtosis has such a periodicity.

8 Claims, 5 Drawing Sheets

(56) References Cited

U.S. PATENT DOCUMENTS

| | | | |
|---|---|---|---|
| 8,204,139 B2* | 6/2012 | Bouzegzi et al. | 375/260 |
| 2004/0116112 A1* | 6/2004 | Gray | 455/423 |
| 2005/0041761 A1* | 2/2005 | Chen et al. | 375/343 |
| 2008/0021345 A1* | 1/2008 | Kern et al. | 600/554 |
| 2008/0056393 A1* | 3/2008 | Niu et al. | 375/260 |
| 2008/0298508 A1* | 12/2008 | Li et al. | 375/320 |
| 2009/0067521 A1* | 3/2009 | Bouzegzi et al. | 375/260 |
| 2009/0154620 A1* | 6/2009 | Mostafa | 375/346 |
| 2009/0164212 A1* | 6/2009 | Chan et al. | 704/226 |
| 2010/0076693 A1* | 3/2010 | Liang et al. | 702/22 |
| 2010/0274554 A1* | 10/2010 | Orr et al. | 704/201 |

OTHER PUBLICATIONS

Abdelaziz Bouzegzi et al., "A Fourth-order Algorithm for Blind Characterization of OFDM Signals", IEEE 9 th Workshop on Signal Processing Advances in Wireless Communications, XP031345973, Jul. 6, 2008, pp. 411-415.

Zhenhui Shen et al., "Multiple Parameters Estimation Simultaneously for DS-SS/BPSK Signal Based on Fourth-order Cumulant 2D Slice", IEEE Internet lonal Conference on Communications, Circuits and Systems, vol. 2, XP010732043, pp. 867-870.

Akmouche W., "Detection of Multicarrier Modulations Using $4^{th}$-order Cumulants", IEEE Military Communications Conference Proceedings, vol. 1, XP010369572, Oct. 31, 1999-Nov. 3, 1999, pp. 432-436.

Xianghong Tang et al., "Identification of Wavelet Modulation Based on Gaussian Detection and Kurtosis of Power Spectrum" IEEE International Conference on Communications and Mobile Computing, XP031434650, Jan. 6, 2009, pp. 181-185.

Abdelaziz Bouzegzi et al., "A Second order Statistics Based Algorithm for Blind Recognition of OFDM Based Systems", Published in IEEE Global Telecommunications Conference, Nov. 2008, 5 pages.

\* cited by examiner

IDENTIFICATION METHOD OF AN OFDM SIGNAL

TECHNICAL FIELD

The present invention relates to a blind identification method of an OFDM signal. This method is in particular applicable to so-called opportunistic telecommunication systems in the field of cognitive radio.

STATE OF PRIOR ART

An opportunistic telecommunication should permanently know its spectral environment in order to adapt the transmission parameters thereof in order not to interfere with existing telecommunication systems, called primary telecommunication systems.

Most primary telecommunication systems with which an opportunistic use of the spectrum is contemplated are OFDM telecommunication systems. Accordingly, it matters for an opportunistic terminal whether an OFDM signal is present in its environment and, if any, to determine the parameters of this signal.

The OFDM modulation is well-known in the state of the art and is utilized in numerous telecommunication systems such as DVB-T, ADSL, Wi-Fi (IEEE 802 a/g), WiMax (IEEE 802.16). It has the advantage of a good spectral efficiency and a good protection against frequency selective fadings.

It is reminded that in an OFDM system, the information symbols to be transmitted are grouped by blocks of N symbols, where N is generally a power of 2, the OFDM symbols being obtained by performing an IFFT (Inverse Fast Fourier Transform) on said blocks of information symbols. Generally, a cyclic prefix is added at the beginning of each OFDM symbol to absorb the inter-symbol interference or ISI and make equalization easier upon reception. The OFDM signal made of these OFDM symbols can then be possibly translated into frequency.

Generally, the signal emitted by an OFDM system can be represented in baseband by:

$$s_a(t) = \frac{\sqrt{E}}{N} \sum_k g(t-kT_s) \cdot \sum_{n=0}^{N-1} a_{k,n} e^{-2i\pi \frac{n}{NT_c}(t-DT_c-kT_s)} \quad (1)$$

where $T_S=(N+D)T_C$ is the duration of an OFDM symbol, E is the power of the signal, N is the number of carriers of the OFDM multiplex, $a_{k,n}$ are the information symbols relating to block k, belonging to a M-ary modulation alphabet, typically BPSK, QPSK or QAM, $1/T_c$ is the information symbol rate where $T_c$ is the "chip" time, D is the size of the cyclic prefix expressed in number of chips, g(t) is OFDM symbols shaping pulse having a time frame $[0,(N+D)T_c]$ for apodizing the spectrum of the signal.

Figure 1:
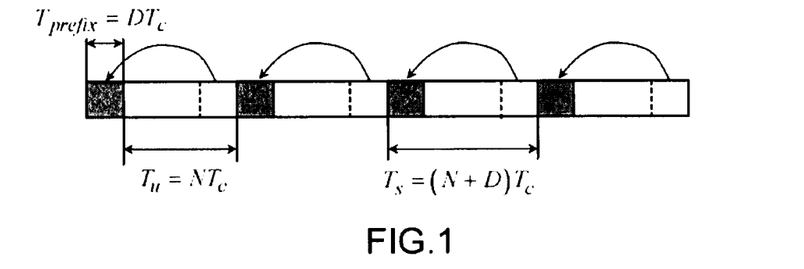
FIG. 1 schematically illustrates an OFDM signal.

An OFDM signal is schematically represented in FIG. 1. It is made of a sequence of OFDM symbols, each symbol having a total duration $(N+D)T_c$ of which a useful duration $NT_c$ and a guard interval of duration $T_{prefix}=DT_c$, wherein the cyclic prefix is located. It is reminded that conventionally, the cyclic prefix is a copy of the end of the OFDM symbol within the guard interval. In some OFDM systems, cyclic prefixes are merely omitted, in other words the useful parts of symbols are separated by "empty" guard intervals.

The known methods for identifying an OFDM signal make use for the most part of the statistical properties of the signal caused by the presence of the cyclic prefix. However, these methods turn out to be poorly efficient when the length of the cyclic prefix is low with respect to the useful duration of the ODFM symbol, which is very common in practice, in particular in WiMax and DVB-T systems. Furthermore, these methods yield poor results when the transmission channels are of the multi-path type.

An identification method using the time periodicity of the auto-correlation function of the OFDM signal was described in the paper of A. Bouzegzi et al. entitled "A second order statistics based algorithm for blind recognition of OFDM based systems" published in IEEE Global Telecommunications Conference (Globecom), November 2008. If this method has a high robustness for small sizes of the cyclic prefix and for multi-path channels, it however requires the presence of a cyclic prefix in OFDM symbols.

Several identification methods have been recently provided to discard the cyclic prefix, in particular the one described in the paper of A. Bouzegzi et al. entitled "A fourth-order based algorithm for characterization of OFDM signals" published in IEEE Workshop on Signal Processing Advances in Wireless Communications (SPAWC), July 2008. This method, based on an entropy minimization criterion at the output of an OFDM demodulator, requires a time and frequency synchronization which is hardly compatible with a real time implementation.

Therefore, the object of the present invention is to provide a blind identification method of an OFDM signal which does not depend on the presence and the nature of the prefix used, in particular of its cyclic character, but without requiring a time and/or frequency synchronization.

Another object of the present invention is to provide an OFDM signal identification method independent of the length of the prefix used, whether cyclic or not, which is robust to both noise and multi-paths.

DESCRIPTION OF THE INVENTION

The present invention is defined by an OFDM signal identification method in a received signal, wherein the received signal is sampled and cut off into blocks of P samples, each block ($B_l$) being then subjected to a Fourier transform to obtain a plurality of symbols l ($â_l(f)$) at a plurality of frequencies. For each frequency of said plurality, is calculated the kurtosis ($\kappa(f)$) of the set of symbols ($â_l(f)$, l=1, . . . , L) thus obtained at this frequency, and then it is determined whether said kurtosis has a periodicity in the frequency domain from kurtosis values calculated for the frequencies of said plurality, and the presence of an OFDM signal is identified in the received signal if the kurtosis has such a periodicity.

Advantageously, to determine whether said kurtosis has a periodicity in the frequency domain, its spectrum is calculated and it is determined whether it has a spectrum peak for a value having a period ($\Delta f$).

Then, the average value ($\overline{\kappa}$) of the kurtosis can be extracted therefrom and the inverse Fourier Transform of the kurtosis thus centred is calculated, a spectrum peak being detected if its height ($\alpha_P$) is higher than a predetermined threshold ($\alpha_T$).

According to another advantageous embodiment, it is attempted to identify the presence of an OFDM signal having a given OFDM symbol duration $T_s$. The number of samples per block is then selected such that $$P_{opt} \approx 1,5 \frac{T_s}{T_e}$$

where $T_e$ is the sampling period.

According to one alternative, the cutting off of the signal sampled into blocks of P samples is repeated for a plurality of values of P, the kurtosis calculation is repeated for said plurality of values of P, the kurtosis spectra thus obtained are calculated, the spectrum peak height ($\alpha_P$) is determined in each of these spectra ($H_P$) and the value $P=P_{opt}$ corresponding to the highest peak height is selected.

In this case, for the selected $P_{opt}$ value, it is advantageously determined whether the spectrum peak has a height ($\alpha_{P\ opt}$) higher than a predetermined threshold value ($\alpha_T$).

The subcarrier spacing of said OFDM signal can also be determined from the position of the spectrum in the kurtosis spectrum obtained for the selected $P_{opt}$ value.

Finally, the useful duration of an OFDM symbol can be determined in said OFDM signal from the position of the spectrum peak in the kurtosis spectrum obtained for the selected $P_{opt}$ value.

BRIEF DESCRIPTION OF THE DRAWINGS

Other characteristics and advantages of the invention will become clearer upon reading preferable embodiments of the invention, in relation with the appended figures wherein.

DETAILED DESCRIPTION OF PARTICULAR EMBODIMENTS

An opportunistic terminal attempting to identify an OFDM signal will be considered in the following, that is attempting to determine whether an OFDM signal is present in its environment and, if necessary, to obtain at least one modulation parameter for this signal. By modulation parameter of the OFDM signal, it is meant here the useful duration of the OFDM symbol ($T_u=NT_c$) or equivalently, the subcarrier spacing ($1/NT_c$), the prefix duration ($DT_c$), the total duration of the OFDM symbol ($T_s=(N+D)T_c$).

It will be supposed that the OFDM signal has the form given by the expression (1), if present.

The opportunistic terminal performs a sampling of the signal received in baseband, the carrier frequency being assumed to be known or belonging to a set of known discrete values. If $f_e=1/T_e$ is the sampling frequency used, chosen sufficiently high to meet the Nyquist criterion relating to the bandwidth of a possible OFDM signal. Thus sampled signal is cut off into L blocks of P samples. The samples of block l can be expressed as:

$$s_{l,a}(p) = s_a(pT_e - lPT_e) \Pi_{PT_e}(pT_e - lPT_e) \quad (2)$$

where $\Pi_{PT_e}$ is the window function having the width $PT_e$ such that $\Pi_{PT_e}(u)=1$ if $0 \leq u < PT_e$ and $\Pi_{PT_e}(u)=0$, otherwise, l is the block index, noted $B_l$. The time width $PT_e$ of a block is chosen sufficiently high to be higher than commonly used durations of the OFDM symbol.

Figure 2:
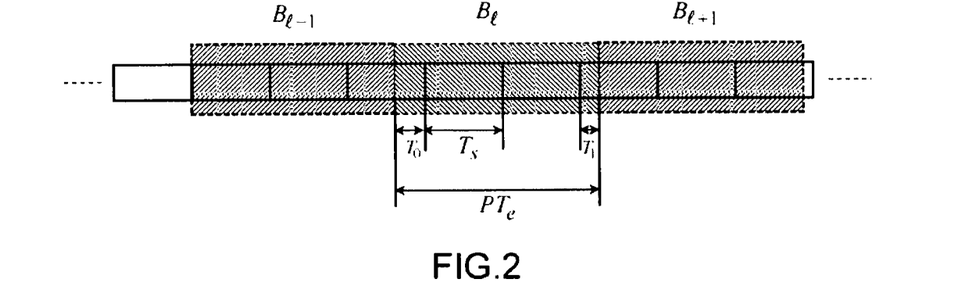
FIG. 2 schematically illustrates a sampling window of an OFDM signal.

FIG. 2 schematically shows the relative positions of the blocks and of the OFDM symbols of the signal received.

For a given block $B_l$, $T_0$ stands for the time separating the beginning of the block and the beginning of the first OFDM symbol contained in that block. Similarly, $T_1$ stands for time separating the end of the block and the end of the last OFDM symbol contained in that block. Index l has been omitted from $T_0$ and $T_1$ to simplify notation. It will be understood that as a general rule, blocks $B_l$ are not synchronized with OFDM symbols.

Once the signal has been sampled and cut off in blocks, a Fourier Transform of each block $B_l$, typically an FFT, is performed to assess the information symbol carried by the carrier f of this block, that is:

$$\hat{a}_l(f) = \sum_{p=lP}^{(l+1)P-1} S_a(pT_e) e^{2i\pi pT_e f} \quad (3)$$

Thus, a sequence of symbols assessed is obtained for each frequency $\hat{a}_l(f)$, $l=1,\ldots,L$ where L is the considered number of consecutive blocks.

It will be assumed here that the information symbols $a_{k,n}$ can be represented by independent and equally distributed random variables. More precisely, these random variables are therefore independent from a OFDM symbol to another and from a carrier to another. The OFDM symbols can contain a prefix or not, whether cyclic or not.

In order to show the independence and robustness of the identification method provided, it will be assumed that the prefix length is zero.

Finally, a noise-free Gaussian channel will be first considered, and the case of a real channel will be then contemplated.

The identification method according to the invention is based on the following remarkable property:
$\forall f \in [0, 1/T_c]$, if $f + \Delta f \in [0, 1/T_c]$ we have:

$$\forall l, \kappa(\hat{a}_l(f)) = \kappa(\hat{a}_l(f + \Delta f)) + O\left(\frac{1}{N}\right) \quad (4)$$

where $\kappa(\hat{a}_l(f))$ is the kurtosis of $\hat{a}_l(f)$ considered as a random variable. In other words, for a given frequency f, the kurtosis of symbols assessed on this frequency is the quasi periodic function in a quasi-period $\Delta f$.

The property (4) can be demonstrated as follows:

$$\hat{a}_l(f) = \sum_{p=lP}^{(l+1)P-1} S_a(pT_e) e^{2i\pi pT_e f} \quad (5)$$

-continued $$= \sum_k \frac{1}{N} \sum_{n=0}^{N-1} a_{k,n} e^{-2i\pi n\Delta f k T_s}$$

$$\sum_{p=lP}^{(l+1)P-1} S_a(pT_e) e^{-2i\pi pT_e(n\Delta f - f)} g(pT_e - kT_s)$$

Since the block $B_l$ is not synchronous with the OFDM symbols, it will generally comprise a first part made of an OFDM symbol end portion having an index $k_0$, a second part made of an integer $K \geq 1$ of OFDM symbols having respective indexes $k_1, \ldots, k_K$ and a third part made of an OFDM symbol beginning portion having the index $k_{K+1}$.

By performing this decomposition in three parts and by introducing the notation $\tilde{a}_{k,n} = a_{k,n} e^{-2i\pi n\Delta f k T_s}$, the expression (5) becomes:

$$\hat{a}_l(f) = \frac{1}{N} \sum_{n=0}^{N-1} \left[ \tilde{a}_{k_0,n} \sum_{p=lP}^{lP+\lfloor T_0/T_e \rfloor} e^{-2i\pi pT_e(n\Delta f - f)} + \right. \tag{6}$$

$$\sum_{k=k_1}^{k_K} \tilde{a}_{k,n} \sum_{p=0}^{\lfloor T_s/T_e \rfloor - 1} e^{-2i\pi pT_e(n\Delta f - f)} +$$

$$\left. \tilde{a}_{k_{K+1},n} \sum_{p=(l+1)P-\lfloor T_1/T_e \rfloor}^{(l+1)P-1} e^{-2i\pi pT_e(n\Delta f - f)} \right]$$

where $\lfloor A \rfloor$ is the highest integer equal to or lower than x, that is else:

$$\hat{a}_l(f) = \frac{1}{N} \sum_{n=0}^{N-1} \left[ \sum_{k=k_0}^{k_{K+1}} \tilde{a}_{k,n} e^{i\theta_k} \Lambda_{k,n}(f) \right] \tag{7}$$

with:

$$\Lambda_{k,n}(f) = \frac{\sin(\pi T_s(n\Delta f - f))}{\sin(\pi T_e(n\Delta f - f))}, k = k_1, \ldots, k_K \tag{8}$$

$$\Lambda_{k_0,n}(f) = \frac{\sin(\pi T_0(n\Delta f - f))}{\sin(\pi T_e(n\Delta f - f))} \text{ and}$$

$$\Lambda_{k_{K+1},n}(f) = \frac{\sin(\pi T_1(n\Delta f - f))}{\sin(\pi T_e(n\Delta f - f))}$$

and where $e^{i\theta_k}$ is a phase term.

The kurtosis of the assessed symbols is by definition given by:

$$\kappa(\hat{a}_l(f)) = \frac{cum_4(\hat{a}_l(f))}{\{E(|\hat{a}_l(f)|^2)\}^2} \tag{9}$$

where $cum_4(\hat{a}_l(f))$ is the 4-order moment (4-order cumulant) of $\hat{a}_l(f)$ and $E(|\hat{a}_l(f)|^2)$ is the variance of $\hat{a}_l(f)$ (having a zero average).

The numerator of the expression (9) can also be written as:

$$cum_4(\hat{a}_l(f)) = cum_4\left( \frac{1}{N} \sum_{n=0}^{N-1} \left[ \sum_{k=k_0}^{k_{K+1}} \tilde{a}_{k,n} e^{i\theta_k} \Lambda_{k,n}(f) \right] \right) = \frac{1}{N^4} \tag{10}$$

$$\sum_{n^{(1)},n^{(2)},n^{(3)},n^{(4)}} \left( \begin{array}{c} \tilde{\Lambda}_{k^{(1)},n^{(1)}}(f) \tilde{\Lambda}^*_{k^{(2)},n^{(2)}}(f) \tilde{\Lambda}_{k^{(3)},n^{(3)}}(f) \tilde{\Lambda}^*_{k^{(4)},n^{(4)}}(f) \\ \sum_{k^{(1)},k^{(2)},k^{(3)},k^{(4)}} E\left( \begin{array}{c} \tilde{a}_{k^{(1)},n^{(1)}} \tilde{a}^*_{k^{(2)},n^{(2)}}, \\ \tilde{a}_{k^{(3)},n^{(3)}}, \tilde{a}^*_{k^{(4)},n^{(4)}} \end{array} \right) \end{array} \right)$$

where $n^{(1)}$ and $k^{(1)}$ have been distinguished for convenience purposes, $i=1, \ldots, 4$ the four indexes n and k being involved in the calculation of the moment and where $\tilde{\Lambda}_{k,n}(f) = e^{i\theta_k} \Lambda_{k,n}(f)$.

Since the information symbols are random variables independent from a symbol to another and from a subcarrier to another, all the crossed terms of the expression (10) are zero and the 4-order cumulant is simplified as:

$$cum_4(\hat{a}_l(f)) = cum_4(\tilde{a}(f)) \left( \frac{1}{N^4} \sum_{n=0}^{N-1} \sum_{k=k_0}^{k_{K+1}} |\Lambda_{k,n}(f)|^4 \right) \tag{11}$$

Similarly, the denominator of the expression (9) can be written as:

$$E(|\hat{a}_l(f)|^2) = E(|\tilde{a}|^2) \left( \frac{1}{N^2} \sum_{n=0}^{N-1} \sum_{k=k_0}^{k_{K+1}} |\Lambda_{k,n}(f)|^2 \right) \tag{12}$$

From the expressions (11) and (12) the kurtosis is then deduced:

$$\kappa(\hat{a}_l(f)) = \kappa(\tilde{a}) \frac{\left( \sum_{n=0}^{N-1} \sum_{k=k_0}^{k_{K+1}} |\Lambda_{k,n}(f)|^4 \right)}{\left( \sum_{n=0}^{N-1} \sum_{k=k_0}^{k_{K+1}} |\Lambda_{k,n}(f)|^2 \right)^2} \tag{13}$$

Since $\kappa(\tilde{a}) = \kappa(a)$, it can now be checked whether the property (4) is satisfied:

$$\kappa(\hat{a}_l(f + \Delta f)) = \kappa(a) \frac{\left( \sum_{n=0}^{N-1} \sum_{k=k_0}^{k_{K+1}} |\Lambda_{k,n}(f + \Delta f)|^4 \right)}{\left( \sum_{n=0}^{N-1} \sum_{k=k_0}^{k_{K+1}} |\Lambda_{k,n}(f + \Delta f)|^2 \right)^2} \tag{14}$$

That is, given the expression (8) of $\Lambda_{k,n}(f)$:

$$\kappa(\hat{a}_l(f + \Delta f)) = \kappa(a) \frac{\left(\sum_{n=-1}^{N-2} \sum_{k=k_0}^{k_{K+1}} |\Lambda_{k,n}(f)|^4\right)}{\left(\sum_{n=-1}^{N-2} \sum_{k=k_0}^{k_{K+1}} |\Lambda_{k,n}(f)|^2\right)^2} \quad (15)$$

and finally:

$$\kappa(\hat{a}_l(f + \Delta f)) = \kappa(a) \frac{\left(\sum_{k=k_0}^{k_{K+1}} \sum_{n=0}^{N-1} |\Lambda_{k,n}(f)|^4 (1 + \varepsilon_k^{(4)})\right)}{\left(\sum_{k=k_0}^{k_{K+1}} \sum_{n=0}^{N-1} |\Lambda_{k,n}(f)|^2 (1 + \varepsilon_k^{(2)})\right)^2} \quad (16)$$

with $$\varepsilon_k^{(i)} = \frac{|\Lambda_{k,-1}(f)|^i - |\Lambda_{k,N-1}(f)|^i}{\sum_{n=0}^{N-1} |\Lambda_{k,n}(f)|^i}, \; i = 2, 4.$$

It will be understood that the $\epsilon_k^{(i)}$s are bound terms and when N tends towards infinity, the property $\kappa(\hat{a}_l(f+\Delta f))=\kappa(\hat{a}_l(f))$ is verified.

Figure 3:
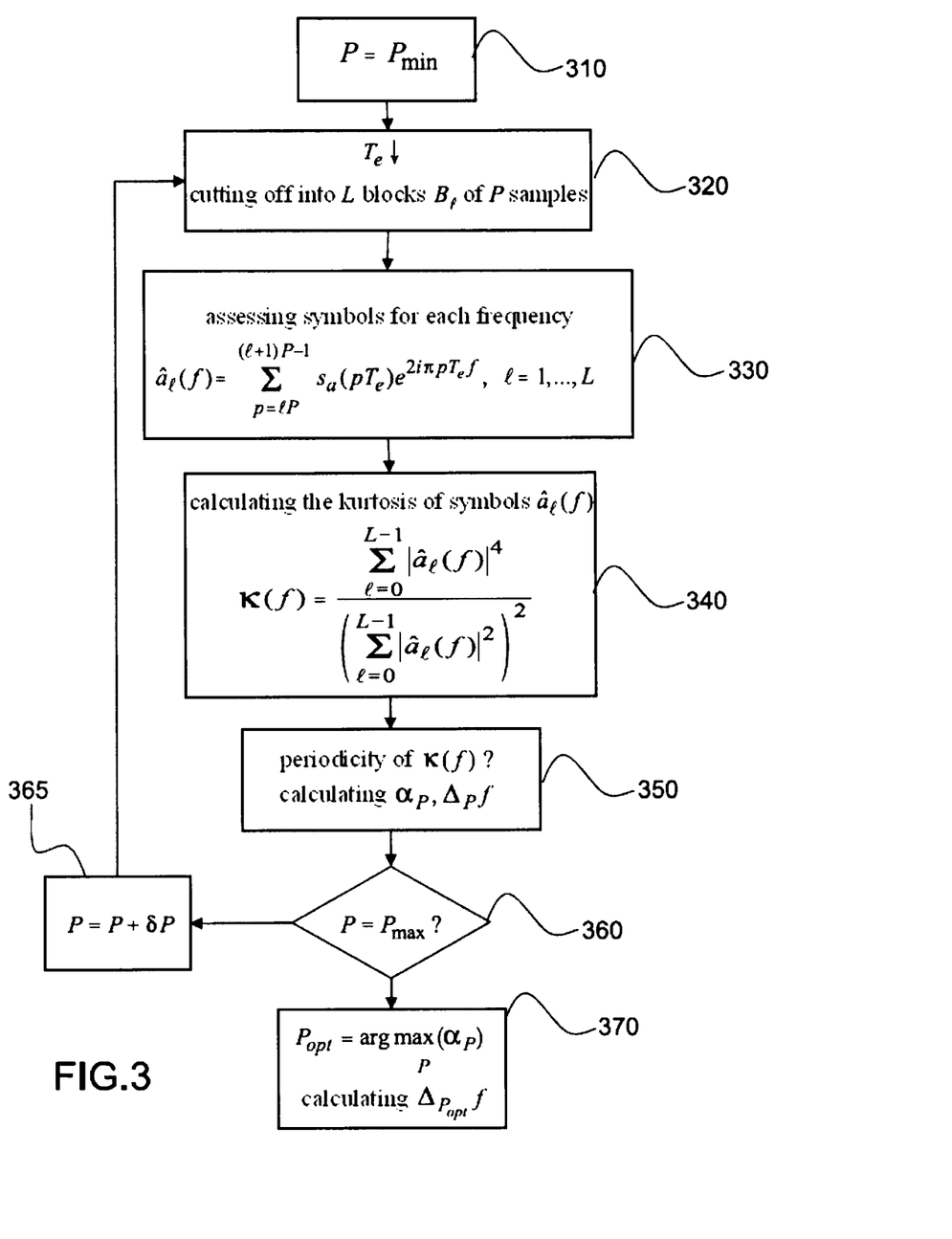
FIG. 3 schematically represents a flow chart of the OFDM signal identification method according to an embodiment of the invention.

FIG. 3 schematically represents the flow chart of the OFDM identification method according to one embodiment of the invention.

It is assumed that the sampling frequency of the signal received in baseband is selected so as to be much higher than the commonly used chip frequencies $1/T_c$.

In step 310, the width P of the sampling windows is chosen, designated in numbers of samples, in other words the time width $PT_e$ of the cutting off blocks of the signal received. In the case where one wants to check the presence of a particular OFDM signal, having a given symbol duration $T_s$, one will advantageously chose:

$$P = \left\lfloor \lambda \frac{T_s}{T_e} \right\rfloor \quad (18)$$

where $\lambda$ is positive real number, preferably higher than 1, and advantageously between 1.2 and 1.7, for example $\lambda$=1.5 as will be seen later on. However, generally, one can proceed in a fully blind manner, that is without knowing beforehand the possible value(s) of $T_s$, in which case a high enough value of P is chosen.

In step 320, the received signal is sampled and is cut off into blocks of P consecutive samples. It is assumed that the number of blocks thus acquired is L.

In step 330, for a plurality of frequencies $f=f_0, \ldots, f_J$, for example for frequencies $f_j=j\delta f$, $j=0, \ldots, J-1$ where $\delta f$ is a frequency sample pitch, chosen low enough with respect to the subcarrier spacing of usual OFDM signals, the symbols carried by this frequency are assessed by Fourier Transform, typically using a FFT, that is according to (3):

$$\hat{a}_l(f) = \sum_{p=lP}^{(l+1)P-1} s_a(pT_e) e^{2i\pi p T_e f}$$

where $s_a(t)$ is the signal received in baseband. For each frequency f, a sequence of symbols $\hat{a}_l(f)$, $l=1, \ldots, L$ is thus obtained.

In step 340, for each frequency f, the kurtosis of symbols assessed at this frequency is calculated, by means of the following expression, defined within a constant as:

$$\kappa(f) = \frac{\sum_{l=0}^{L-1} |\hat{a}_l(f)|^4}{\left(\sum_{l=0}^{L-1} |\hat{a}_l(f)|^2\right)^2} \quad (19)$$

As has been seen herein above, if an OFDM signal is present in the received signal with the subcarrier spacing of $\Delta f$, the kurtosis $\kappa(f)$ is a quasi-periodic function having a quasi-period $\Delta f$.

In step 350, it is determined whether the kurtosis $\kappa(f)$ actually has such a periodicity. For example, the inverse Fourier Transform of the kurtosis $\kappa(f)$ of which the continuous component thereof has been subtracted therefrom, is calculated, that is:

$$H_P = TF^{-1}(\kappa(f) - \bar{\kappa}) \quad (20)$$

and it is determined whether there is a peak in the spectrum thus obtained.

Those skilled in the art will understand that further methods for determining the kurtosis periodicity can be used, in particular from the maximum of the autocorrelation function of $\kappa(f)$.

The period or quasi-period thus determined is quoted $\Delta_P f$ and the height of the spectrum peak or of the maximum of the autocorrelation function is quoted $\alpha_P$.

A detection threshold could be used to search the periodicity, for example to determine whether the spectrum peak or the maximum of the autocorrelation function of the kurtosis is indeed significant. Other criteria for detecting the periodicity of the kurtosis could be contemplated and this without departing from the scope of the present invention.

If no OFDM signal is present, the spectrum $H_P$ does not have a significant peak and no periodicity is detected in the kurtosis of the assessed symbols.

According to a first alternative, the identification method stops at this step. This will be in particular the case when it is merely desired to check whether an OFDM signal having a given symbol duration $T_s$ is present in the received signal.

According to a second alternative, advantageously used in a fully blind mode, a range of sampling window width is scanned from a minimum value $P_{min}$ to a maximum value $P_{max}$.

For this, it is tested in step 360 whether $P=P_{max}$. If no, the width of the sampling window is incremented in 365, $P=P+\delta P$, where $\delta P$ is an integer equal to or higher than 1, and then the process goes back to step 320. On the other hand, if yes, the identification method proceeds to 370.

In 370, the width of the block $P_{opt}$ having provided the highest spectrum peak height or the maximum of the autocorrelation value is determined, that is $$P_{opt} = \underset{P}{\mathrm{argmax}}(\alpha_P).$$

The period or quasi-period is then given by $\Delta_{P\,opt} f$.

As above, a detection threshold $\alpha_T$ can be used to conclude that an OFDM signal is present or not. For example, the highest spectrum peak height value, that is $\alpha_{P\,opt}$, can be compared with this threshold value and it will be concluded that an OFDM signal is present only if $\alpha_{P\,opt} > \alpha_T$.

Whatever the alternative used, the identification method provides the $\Delta f$ period and/or the corresponding useful duration of OFDM symbols.

Figure 4A:
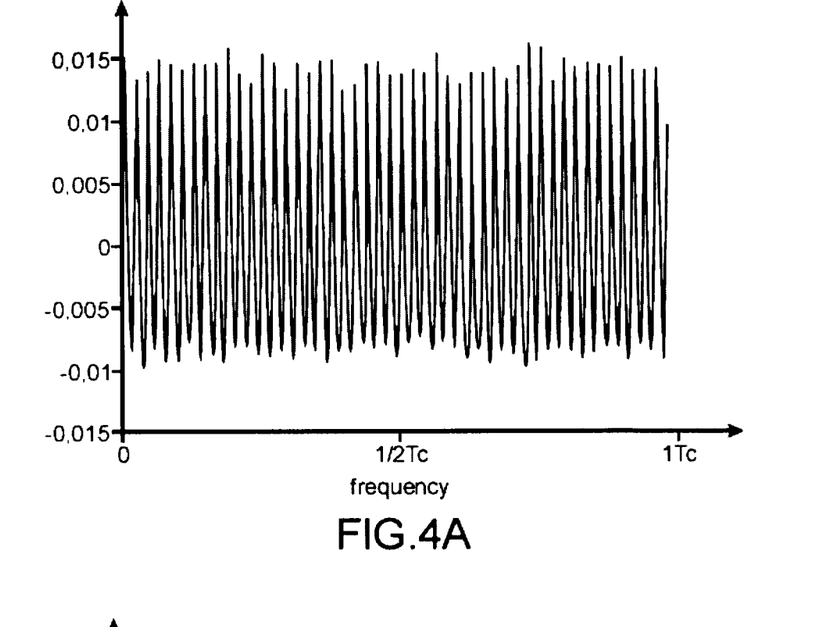
FIG. 4A illustrates the variation of the kurtosis of a group of symbols assessed by frequency, for an OFDM signal being propagated in a BBAG channel.

FIG. 4A represents the variation of the kurtosis $\kappa(f)$ of a group of symbols assessed for each frequency f, in the case of an OFDM signal propagated in an additive white Gaussian noise (AWGN) channel. There will be noticed the periodic appearance of the function $\kappa(f)$ symptomatic of the presence of an OFDM signal.

Figure 4B:
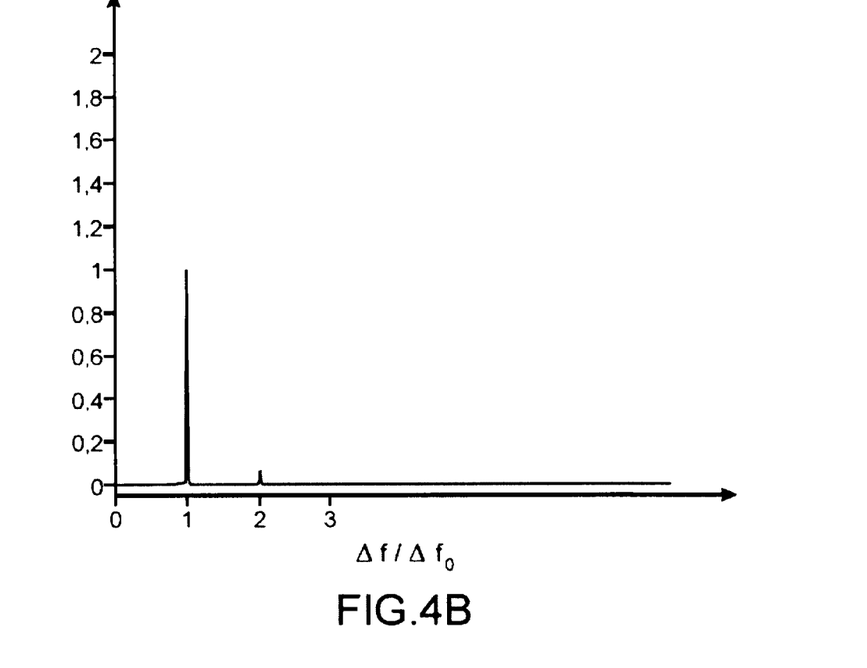
FIG. 4B shows the spectrum of the kurtosis of FIG. 4A.

FIG. 4B represents the kurtosis spectrum of FIG. 4A. The normalized variable $\Delta f/\Delta f_0$ is shown in abscissa where $\Delta f_0$ is the subcarrier spacing of the OFDM signal actually present in the received signal. It will be noted the presence of a distinct peak in $\Delta f/\Delta f_0 = 1$, which means on the one hand that an OFDM signal has well been identified in the received signal and, on the other hand, that its subcarrier spacing/useful duration of the OFDM symbol has been correctly assessed.

Figure 5A:
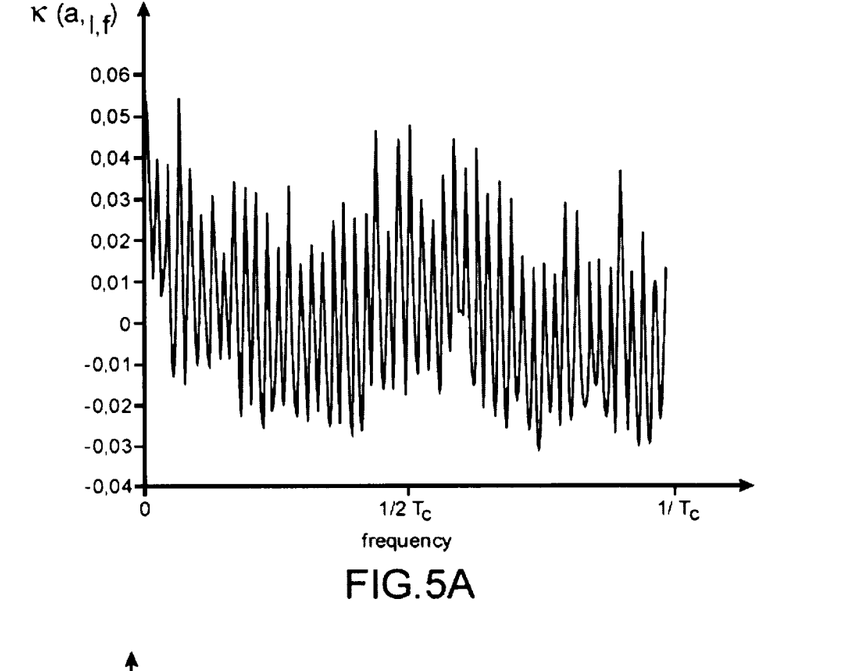
FIG. 5A illustrates variations of the kurtosis of a group of symbols assessed by frequency, for an OFDM signal being propagated in a multi-path type channel.

FIG. 5A represents the variation of the kurtosis $\kappa(f)$ of a group of symbols assessed for each frequency f, in the case of an OFDM signal being propagated in a multi-path channel. It is noticed that the curve appearance is substantially more disturbed than that of FIG. 4A but that it however exhibits periodic variations.

Figure 5B:
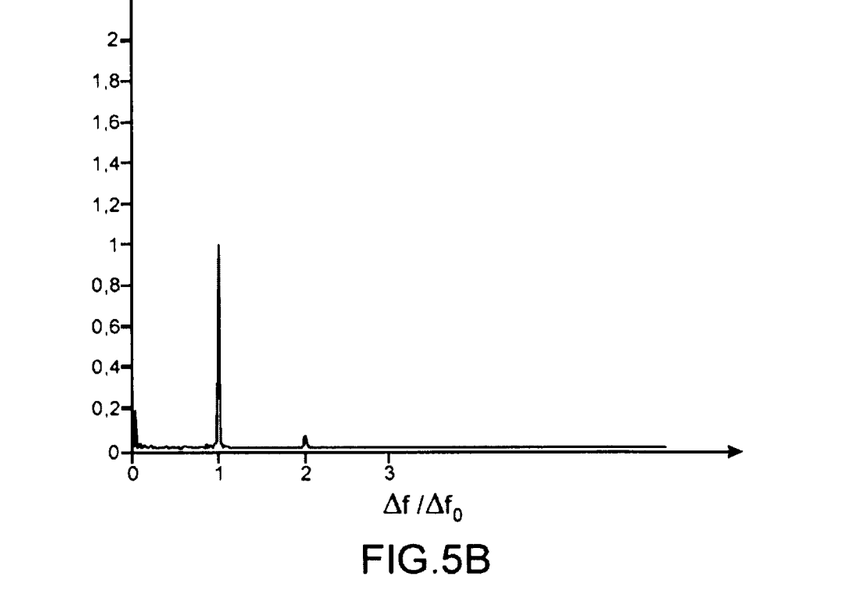
FIG. 5B shows the spectrum of the kurtosis of FIG. 5A.

FIG. 5B represents the kurtosis spectrum of FIG. 5A. Once again, the normalized variable $\Delta f/\Delta f_0$ is shown in abscissa. The presence of a peak in $\Delta f/\Delta f_0 = 1$ is observed with the same conclusions as above, which clearly shows the robustness of the identification method.

Figure 6:
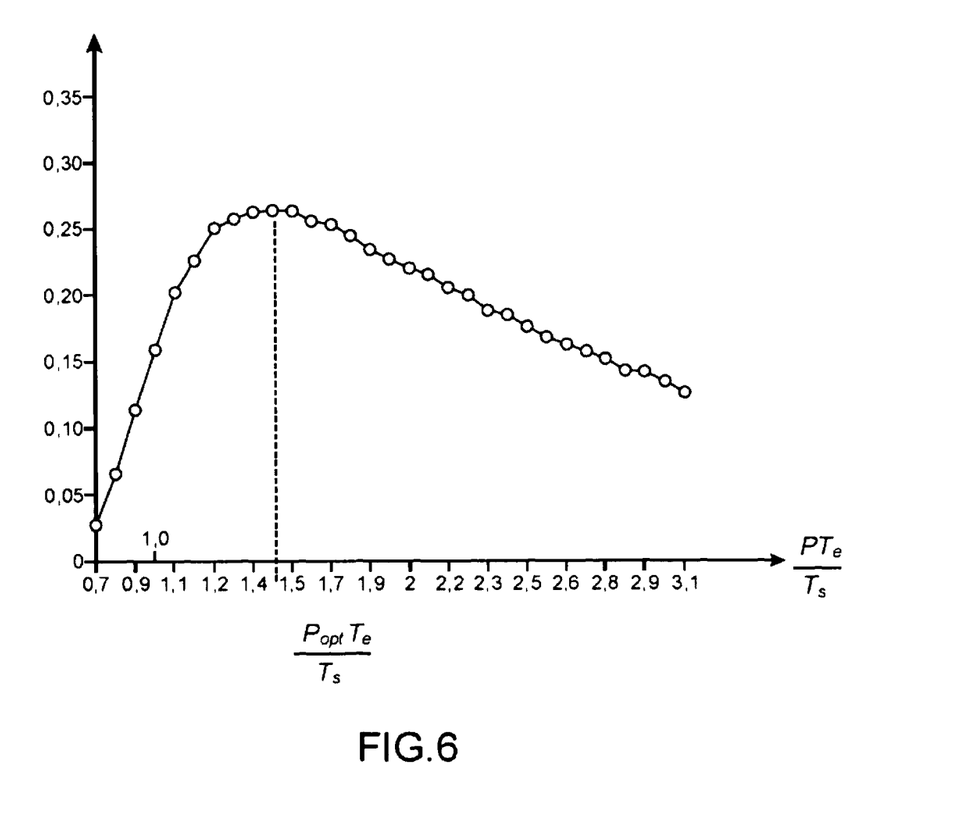
FIG. 6 represents one exemplary variation in the peak height of the kurtosis spectrum as a function of the ratio of the sampling window width to the duration of an OFDM symbol.

FIG. 6 represents the spectrum peak height $\alpha_P$ as a function of the ratio $$\frac{PT_e}{T_s}$$

of the cutting off blocks width and the OFDM symbol duration, $T_s$.

It is observed in this figure that the most pronounced spectrum peak is obtained when $$\frac{PT_e}{T_s} \approx 1,5,$$

in other words $$P_{opt} \approx 1,5\frac{T_s}{T_e}.$$

Thus, when one has to determine whether an OFDM signal having a symbol duration $T_s$ is present or not, one will advantageously chose $P = P_{opt}$.

The invention claimed is:

1. An OFDM signal identification method for identifying an OFDM signal in a received signal, implemented by a terminal, comprising:
   sampling and cutting off the received signal into blocks of P samples, P being an integer;
   subjecting each block of P samples to a Fourier transform to obtain a plurality of symbols at each of a plurality of frequencies;
   calculating, for each frequency of the plurality of frequencies, kurtosis of a set of symbols obtained for a current frequency of the plurality of frequencies;
   determining whether the kurtosis calculated over the plurality of frequencies has a periodicity in a frequency domain; and
   identifying presence of an OFDM signal in the received signal when the kurtosis has such a periodicity.

2. The identification method according to claim 1, wherein the determining of whether the kurtosis has a periodicity in the frequency domain further comprises calculating a spectrum of the kurtosis and determining whether the kurtosis has a spectrum peak for a value having a period.

3. The identification method according to claim 2, wherein the determining of whether the kurtosis has a periodicity in the frequency domain further comprises subtracting an average value of the kurtosis from the kurtosis to produce a result which represents the kurtosis being centered and calculating an inverse Fourier Transform of the kurtosis centered, comparing a spectrum height of the kurtosis centered in the frequency domain and a predetermined threshold and detecting a spectrum peak when the spectrum height of the kurtosis centered in the frequency domain is higher than the predetermined threshold.

4. The identification method according to claim 1, the OFDM signal having a given OFDM symbol time duration $T_s$, and selecting the P samples per block such that $$P_{opt} \approx 1,5\frac{T_s}{T_e},$$

wherein $T_e$ is the sampling period, $P_{opt}$ is an integer.

5. The identification method according to claim 1, wherein the cutting off of the received signal sampled into blocks of P samples is repeated for a plurality of different integer values of P, calculating kurtosis spectra by repeating the calculating of the kurtosis for the plurality of values of different integer values of P, determining a spectrum peak height in each spectrum of the kurtosis spectra, and the determining of whether the kurtosis has a periodicity in the frequency domain further comprises selecting a value $P = P_{opt}$ corresponding to a highest peak height of the kurtosis spectra, wherein $P_{opt}$ is an integer.

6. The identification method according to claim 5, wherein, for the selected $P_{opt}$ value, the method includes determining whether the spectrum peak has a height higher than a predetermined threshold value.

7. The method according to claim 5, further comprising determining subcarrier spacing of the OFDM signal based on a position the spectrum peak height in a kurtosis spectrum of the kurtosis spectra determined corresponding to the selected $P_{opt}$ value.

8. The identification method according to claim 5, further comprising determining a useful duration of an OFDM symbol in the OFDM signal based on a position of the spectrum peak height in a kurtosis spectrum of the kurtosis spectra determined corresponding to the selected $P_{opt}$ value.

* * * * *